No. 828,335. PATENTED AUG. 14, 1906.
A. E. POST.
DRY BATTERY CELL.
APPLICATION FILED MAY 17, 1905.
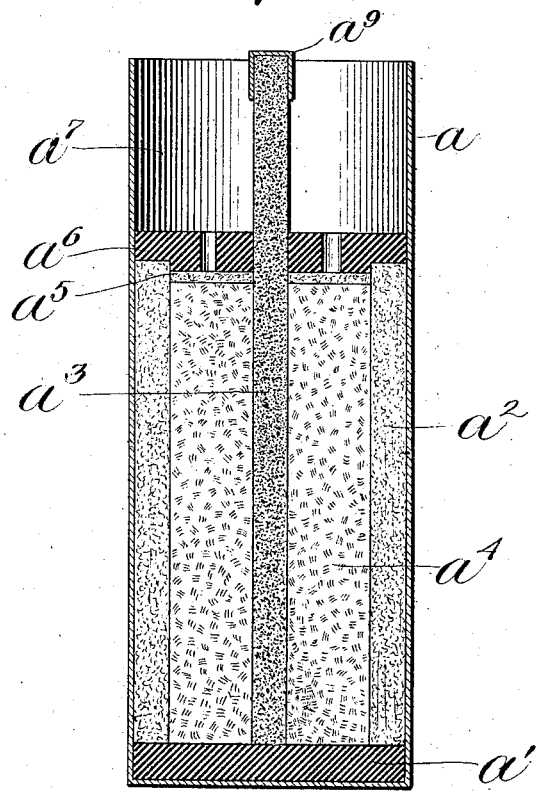
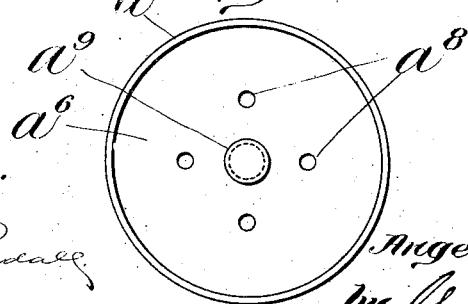
Witnesses:
Arthur J. Randall
M. A. Jones
Inventor:
Angelica E. Post,
by Geo. H. Maxwell,
Attorney.

UNITED STATES PATENT OFFICE.

ANGELICA E. POST, OF BOSTON, MASSACHUSETTS.

DRY-BATTERY CELL.

No. 828,335.

Specification of Letters Patent.

Patented Aug. 14, 1906.

Application filed May 17, 1905. Serial No. 260,763.

*To all whom it may concern:*

Be it known that I, ANGELICA E. POST, a citizen of the United States, residing at Boston, in the county of Suffolk and State of Massachusetts, have invented an Improvement in Dry-Battery Cells, of which the following description, in connection with the accompanying drawings, is a specification, like letters on the drawings representing like parts.

As is well known, one great disadvantage in the practical employment of so-called "dry" batteries is their rapid deterioration, as the compounded chemicals keep constantly acting more or less upon each other. It makes little difference how or where a dry battery is kept it will inevitably deteriorate if kept long, so that when it is finally called into use it will be found to be weak or entirely exhausted.

My invention has for its object the provision of a battery which can be kept indefinitely without deterioration, so that it will make no difference how long the battery may have been standing upon the shelves or in the store-room it will be fresh and fully active whenever called upon for use. I have discovered that by compounding the ingredients in an absolutely dry condition and packing them in the battery-cell in such a manner that they maintain their dry condition until required for use they will not deteriorate. As, however, moisture is essential to their operation, I provide means for introducing moisture to a proper amount into the cells when it is desired to use them.

The constructional details, operation, and further advantages of my invention will be pointed out in the course of the following description, reference being had to the accompanying drawings, in which I have illustrated one embodiment of my invention.

In the drawings, Figure 1 is a central vertical sectional view of a cell constructed according to my invention, and Fig. 2 is a top plan view thereof.

It will be understood that my invention in its more general features is applicable to any usual or preferred form or type of so-called "dry-battery" cell. I have herein illustrated the same in connection with a zinc-cup cell.

In preparing my cell I first place in the bottom of the zinc-cup or holder $a$ a bottom layer or disk $a'$ of paraffined paper or equivalent dry insulator. On this disk I tightly force a tube or lining wall $a^2$ of relatively thick absorbent material of the nature of heavy blotting-paper. Then I stand a usual carbon electrode $a^3$ axially, as shown, and pack around it the filling $a^4$ of chemicals in an absolutely dry state. It will be understood that these chemicals may be varied considerably by those skilled in the art. I have obtained the most permanent and advantageous results by employing manganese dioxid, graphite, chlorid of zinc, and salammoniac, the first-mentioned slightly in excess in quantity of all the others together, the remaining three being in approximately equal quantities, with the graphite slightly predominating. Having thoroughly mixed these salts in a dry powdered condition, I press them in tightly around the electrode $a^3$ and then tightly pack them with a closing layer or disk $a^5$ of absorbent material similar to the wall $a^2$. On this I pour or pack a more or less impervious guard or closing layer $a^6$, terminating considerably short of the top of the cell, so as to leave an open space $a^7$ for a purpose presently to be described. The layer $a^6$ may consist of a bituminous compound or of a porcelain-like substance or cement or paraffined paper, cork, clay, or paper-pulp, or the like. Through this top covering $a^6$ I form one or more holes $a^8$, four thereof being herein indicated. These holes are for the free passage of water, which unites with the contained ingredients to energize them whenever it is desired to use the cells. On the upper end of the carbon $a^3$ I drive a copper cap $a^9$, (in the case of small cells,) to which a terminal wire may be soldered, (it being understood that in large cells the usual bipuring-post is used.)

The absorbent lining $a^2$ $a^5$ not only serves to insulate the chemicals from the zinc electrode as long as the cell remains inactive, but serves the more important function of maintaining the chemicals absolutely dry, absorbing any moisture which might creep down the sides or tend to percolate toward the interior. This absorbent material acts to absorb any moisture that might be produced by or within the chemicals and it also effectually shields the chemicals from extraneous moisture. The covering $a^6$ seals the joints and practically hermetically seals the entire cell, excepting for the holes $a^8$, which, however, terminate not at a joint, but flat against an interior portion of the layer $a^5$, so that even if any moisture from the atmosphere should penetrate through said holes it is simply absorbed and dissipated in the upper side of said layer $a^5$ and does not reach the dry compound within.

I have found after long and varied experiment that a cell constructed as above described will maintain its strength practically without limit and when called upon for use it will have its original freshness and activity and the same voltage as if just made, whereas a cell built up in the ordinary manner would long since have become entirely exhausted and useless by age.

When it is desired to use one of my cells, all that is necessary to do is to pour the open space $a^7$ full of water, which at once freely enters through the holes $a^8$ and passes through the blotting-paper or other porous substance $a^5$ and properly saturates the contained chemicals. As it does so it also saturates the absorbent wall $a^2$ and causes the contained electrolyte to be absorbed thereby, rendering the cell in proper condition to operate when the zinc exterior $a$ and the carbon $a^3$ are externally connected in circuit.

It will be understood by those skilled in the art that my invention has a wide range of usefulness in dry-battery construction, as, with slight changes, it is readily adaptable to the various well-known forms of dry-battery cells. It is useful in connection with all kinds of dry-battery work, from the small pocket-lamps to the large motor-car outfits, and the liquid-receiving apertures will be placed accordingly, suiting the convenience of the particular shape or style of the outfit.

Instead of filling the cell with the compound stated a portion of the ingredients may be placed therein, and the salts, for instance, constituting the electrolyte may be held in liquid form in a bottle or other separate inclosure until it is desired to use the cell, whereupon said liquid may be poured into the open space $a^7$ and permitted to percolate through the contents of the cell in the same manner as already described, and accordingly it will be understood that I have used the word "water" herein in the sense merely of a moisture-producing vehicle or energizer capable of uniting with and rendering active the previously-dry constituents within the pervious walls of the cell.

Having described my invention, what I claim as new, and desire to secure by Letters Patent, is—

1. As an article of manufacture, a cell, containing a central electrode, having all the active ingredients including a dry excitant mixed together and packed around and in contact with said central electrode, said ingredients being maintained in an absolutely dry condition as long as the cell is not being used, said cell containing dry absorbent means surrounding said dry ingredients in direct superficial contact therewith for absorbing from the latter any extraneous moisture and maintaining said ingredients in their said normally dry condition.

2. As an article of manufacture, a cell, comprising a central electrode and a cup-electrode separated therefrom and partially filled with all the remaining active cell ingredients, including excitant material, all mixed together in operative relation to act upon each other at all points throughout the mixture, said ingredients being packed dry in peripheral contact with said central electrode and maintained in an absolutely dry condition, insulating material separating said ingredients entirely from the walls of said cup, a portion of said insulating material being of an absorbent nature and maintained dry, and a permanent impervious closure for said ingredients perforated to admit water when it is desired to use the cell.

3. As an article of manufacture, a cell, comprising opposite electrodes, and intervening active material, having all its active ingredients including the excitant substances mixed together and packed and maintained in an absolutely dry condition, an imperforate layer of absorbent material tightly sealing the outer end of said packed ingredients, and a superimposed, hard, impervious protector provided with means permitting the introduction of water at the time of use of the cell without disturbing the inclosed ingredients.

4. As an article of manufacture, a cell, having its ingredients packed in absolutely dry condition, and normally maintained dry, and means for maintaining the same dry including a dry, porous, vertical wall entirely surrounding said ingredients, a dry porous disk tightly closing the outer end of said ingredients, and a tight-fitting protector above said disk having openings therethrough for permitting the entrance of water for rendering the cell active.

5. As an article of manufacture, a cell, having its ingredients packed therein in an absolutely dry condition, means surrounding said ingredients for normally maintaining them dry as long as the cell is not used, the upper end of the cell having a large open space, and the ingredients and their inclosing top layers terminating sufficiently below the top of the cell to provide said large open space, and means at the bottom of said open space and the top of said ingredients for permitting the entrance of water from the bottom of said space when desired.

6. As an article of manufacture, a cell, comprising opposite electrodes and intervening active material, having all its ingredients including the excitant mixed together and packed therein in absolutely dry condition, enveloping dry absorbent means for maintaining said included ingredients normally dry, and means for the admission in quantity of a liquid energizer when desired.

In testimony whereof I have signed my name to this specification in the presence of two subscribing witnesses.

ANGELICA E. POST

Witnesses:
 LOUIS POST,
 GEO. H. MAXWELL.